United States Patent [19]

Kao et al.

[11] 4,080,528
[45] Mar. 21, 1978

[54] DATA INTERLACING SYSTEM

[75] Inventors: Charles T. Kao, Garland; James O. Lafevers, Richardson, both of Tex.

[73] Assignee: Recognition Equipment Incorporated, Dallas, Tex.

[21] Appl. No.: 679,752

[22] Filed: Apr. 23, 1976

[51] Int. Cl.² .................... G06K 9/12; G11B 5/43
[52] U.S. Cl. .................. 235/449; 340/146.3 C; 360/26
[58] Field of Search ............ 235/61.7 A, 61.12 M, 235/61.11 D; 360/2, 22, 23, 26, 32, 63; 340/146.3 C

[56] References Cited

U.S. PATENT DOCUMENTS

| | | | |
|---|---|---|---|
| 3,790,954 | 2/1974 | Devore et al. | 360/26 |
| 3,851,335 | 11/1974 | Elliott | 360/26 |
| 3,978,450 | 8/1976 | Sanner et al. | 340/146.3 C |

Primary Examiner—Vincent P. Canney
Attorney, Agent, or Firm—John E. Vandigriff

[57] ABSTRACT

A system for accurately merging data signals generated by two spaced apart multi-element MICR read heads is provided. Digital data signals are sampled near the signal peaks, converted to NRZ (non-return-to-zero) data and synchronized to a common fixed frequency. The digital data signals then are serialized to form two digital data streams, each of which corresponds to the responses of one of the two read heads. Phase differences between the two data streams are detected and corrected. In accordance with the invention, the data streams are interlaced to form a single digital data stream accurately representative of the information field sensed by the MICR read heads.

11 Claims, 14 Drawing Figures

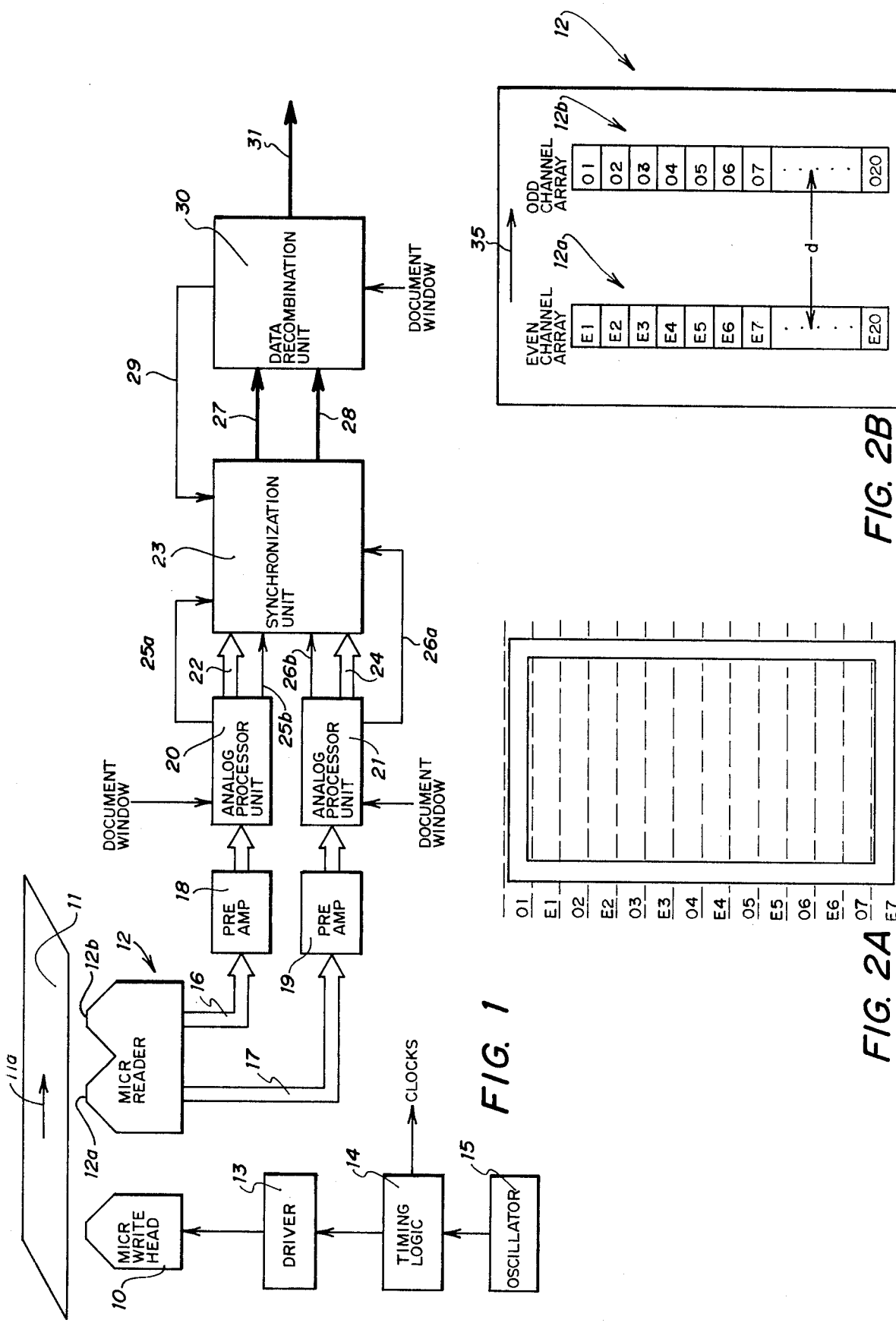

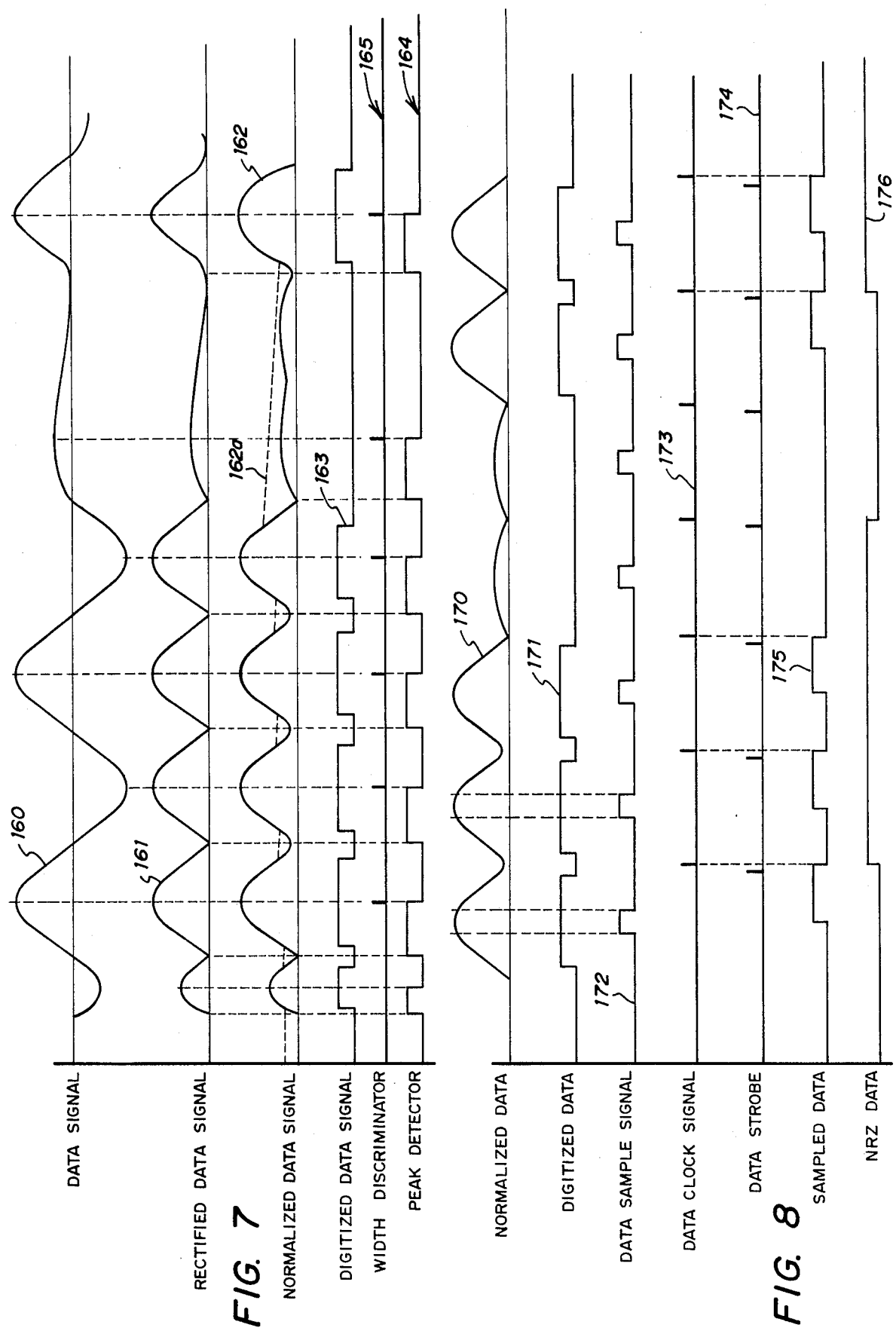

DATA INTERLACING SYSTEM

FIELD OF THE INVENTION

This invention relates to automated reading operations for characters printed in magnetic ink, and more particularly to the recombination of data signals generated by asynchronously operating multi-element magnetic read heads spaced apart in the direction of character movement.

DESCRIPTION OF THE PRIOR ART

Magnetic ink character recognition (MICR) systems are widely used for sensing information recorded on documents such as checks, credit card slips, and mailpieces.

In one type of MICR data lift system, a transport moves a document having alphanumeric magnetic ink characters printed thereon through a reading station. At the station, a MICR reader sensitive to the character being passed therethrough responds to the magnetized material. The response is in the form of an analog signal, the waveform of which is unique to the particular character.

MICR readers employ a magnetic read head which generates an analog signal representing the first derivative of the magnetic field surrounding the character as a function of time. The analog signal then may be processed by digitizing the signal and comparing with known digital signals to identify the particular character read. A synchronizer or clock is utilized to interrupt the signal from the read head as a function of the space occupied by the character on the document. In this way, a discrete signal is generated which corresponds to a portion of the magnetic field sensed during passage of a character through registration with the magnetic read head.

An improvement in MICR systems utilizes a pair of multi-element magnetic read heads, one adjacent to the other perpendicular to the direction of movement of the character to be read. Such units read characters as a series of horizontal slices or tracks. A head reading an individual track responds to the magnetic field associated with the area of that track. Preferably, the tracks sensed by one read head partially overlaps the tracks sensed by the second read head. The response of each individual head may then be stored as a two-dimensional digitized signal matrix. By increasing the number of tracks, i.e., the number of heads, and by simultaneously decreasing the signal sample interval, the array may be expanded to provide higher resolution. Because of physical constraints, the total number of tracks into which a single character may be subdivided is limited.

A shaft encoder or tachometer has been provided to control the delay of scan responses from one read head to compensate for document travel over the distance between the two read heads. Thereafter, the delayed signals are interlaced with the unimpeded signals to produce a single signal stream for analysis.

Despite this improvement, MICR systems still have significant shortcomings. In the processing of data signals generated by the spaced apart read heads, the data of one reader is interlaced with the data of the second reader to provide a serial data stream. As the two readers are separated by a fixed distance, a fixed delay has been incorporated to synchronize the two data signals. It has been found, however, that the delay may vary because of differences in transport speeds and document slippage. Although shaft encoders are sensitive to slow variations in transport speed as compared to the transport period between read heads, the encoders are insensitive to transport speed variations of short duration.

The inability to compensate for transport delays caused by transport speed variations of short duration, variations in document size, and document slippage has been manifested by an interlaced serial data stream which does not accurately represent the information field being scanned.

The data interlacing system of the present invention provides a fixed scan frequency to which the data signals generated by each read head may be synchronized, dynamically adjusts for both slow and rapid changes in the transport delay between spaced apart MICR read heads, and merges the data signals into a serial data stream accurately representative of the information field scanned by each of the read heads.

SUMMARY OF THE INVENTION

A data interlacing system is provided for merging two discrete data streams generated by spaced apart multi-element MICR read heads. More particularly, a fixed frequency is provided to which each data stream may be synchronized. The leading edges of characters occurring in each data stream are detected, and the times of occurrence in the two data streams compared. Phase differences between the data streams are corrected in scan period increments at the scan rate, and the two data streams are interlaced to form a single data stream accurately representative of the information field viewed.

BRIEF DESCRIPTION OF THE DRAWINGS

For a more complete understanding of the present invention and further objects and advantages thereof, reference may now be had to the following description taken in conjunction with the accompanying drawings in which:

FIG. 1 is a functional block diagram of a MICR data lift system embodying the invention;

FIGS. 2A and 2B illustrate the data sequence and horizontal separation between the dual MICR read heads embodied in the system of FIG. 1;

FIGS. 7, 8 and 9 are timing and output waveform diagrams illustrating the operation of the system of FIG. 1;

FIG. 1

FIG. 1 illustrates in functional block diagram form a dual column data lift system with which an exemplary set of parameters will be described.

Figure 3:
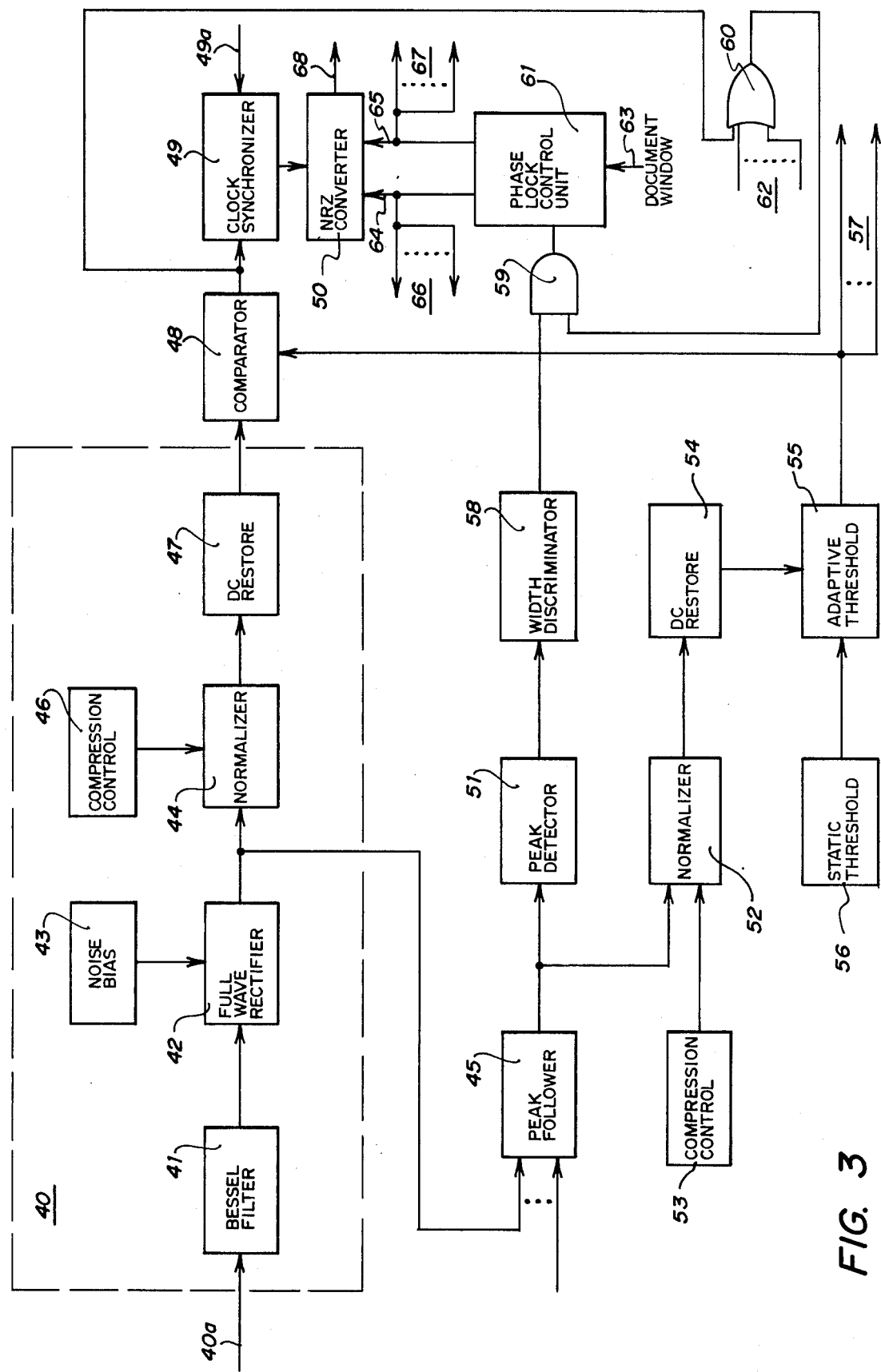
FIG. 3 is a functional block diagram of an analog processor unit comprising the system of FIG. 1.

A single gap MICR write head 10 magnetizes magnetic material in an information field printed on the surface of a document 11. The write head 10 is excited sinusoidally to polarize magnetic material used to print characters to aid in the detection thereof by a MICR reader 12.

A sinusoidal signal from a driver 13 drives write head 10 in response to a 30.8 KHz square wave generated by a timing logic unit 14. Logic unit 14 receives a system clock signal from a 7.885 MHz crystal oscillator 15.

As the document 11 is transported at a constant velocity past the reader 12 in the direction indicated by the arrow 11a, horizontal segments spanning the information field thereon are sensed, and the sinusoidally polarized portions are detected.

In the embodiment described herein, MICR reader 12 is comprised of two multi-element read heads 12a and 12b spaced apart in the direction of arrow 11a. The elements are of like width and spacing, but one head 12a is offset perpendicular to the arrow 11a relative to the other head 12b. The resulting staggered element arrangement assures that horizontal slices or tracks of any information field sensed by a first read head 12a are slightly overlapped by the horizontal tracks sensed by a second read head 12b. In this embodiment each read head has 20 sensing elements interfacing with 20 parallel data channels.

Responses generated by the read head 12a in the document path are referred to herein as even channel responses. Responses generated by the read head 12b are referred to as odd channel responses. Odd channel responses are transmitted along data channels 16 to a preamplifier 18. Even channel responses are transmitted along data channels 17 to a preamplifier 19. Each of the channels 16 and 17 is a dual transmission line. The signals thereon are amplified by preamplifiers 18 and 19 (common mode rejection amplifiers) and converted from dual line signals to single line signals.

As each document approaches reader 12, a conventional document presence sensor (not shown) generates a document window pulse to enable analog processor units 20 and 21.

The analog processors condition, digitize and convert the reader responses to NRZ (non-return-to-zero) digital signals. If an information signal is present, the analog processor output is a logic one pulse having a pulse width indicative of the width of a magnetic character segment appearing on the surface of document 11. If a horizontal track of the information field includes plural character segments, the output of the corresponding analog processor unit is a series of logic one pulses having widths dependent upon corresponding segment widths.

The odd channel outputs of unit 20 are applied in parallel on data channels 22 to a synchronization unit 23. Even channel outputs of unit 21 are applied in parallel on data channels 24 to unit 23. Timing pulses are data strobes generated by timing logic 14 and occurring at twice the 30.8 KHz write frequency issue from units 20 and 21 on control lines 25a and 26a, respectively, to control the parallel loading of the analog processor outputs into buffer registers in unit 23. Further, units 20 and 21 issue pulses on control lines 25b and 26b, respectively, to signal the occurrence of data peaks.

Synchronization unit 23 functions to receive the forty channel parallel outputs of processor units 20 and 21, and to apply a serial stream of even data to a data channel 27 and a serial stream of odd data to a data channel 28. In addition to the data strobe signals on lines 25a and 26a and the data peak signals on lines 25b and 26b, unit 23 further receives a begin scan synchronization signal. This appears on a control line 29 leading from a data recombination unit 30. As will be described, unit 23 synchronizes data flow from the asynchronously operating analog processor units 20 and 21. Concurrently, unit 23 senses lines 25b and 26b, and resets if a predetermined number (12) of vertical scan periods elapse between the occurrence of data peak signals.

Data recombination unit 30 is enabled by the document window signal to receive the even channel data on channel 27 and the odd channel data on channel 28. The recombination unit interleaves or interlaces the odd and the even channel data to form a single stream of data to be applied by way of a data channel 31 to a succeeding character recognition system.

FIGS. 2A and 2B

FIGS. 2A and 2B graphically illustrate the vertical interleaving of the sensing elements comprising the read heads of the reader 12, and the horizontal separation between the read heads.

As a document travels past reader 12, even horizontal slices or tracks of the information field are sensed by a read head 12a and odd horizontal tracks by a read head 12b. Assuming the numeral "0" illustrated in FIG. 2A moves across reader 12 in the direction of arrow 35, read head 12a scans even horizontal tracks E1-E7. Read head 12b scans odd horizontal tracks O1-O7. The even channel responses, therefore, would reflect the character segment content of tracks E1-E7, and the odd channel responses would reflect the character segment content of tracks O1-O7. With distance (d) separating read heads 12a and 12b, even channel data on a given character stroke appears before the odd channel data.

For the example of FIGS. 2A and 2B, the twenty channel parallel data output of processor unit 21 of FIG. 1 would comprise six even channel waveforms having two narrow logic one pulses separated by a wide logic zero level, and a seventh waveform having a single wide logic one pulse. The parallel data output of processor unit 20, however, would comprise a first odd channel waveform having a single wide logic one pulse, followed by six odd channel waveforms having two narrow logic one pulses separated by a wide logic zero level.

FIG. 3

FIG. 3 illustrates in functional block diagram form an analog processor unit comparable to units 20 and 21 of FIG. 1.

One of 40 channels of analog data generated by reader 12 is applied by way of a data line 40a to a Bessel filter 41, which attenuates the high frequency noise without distorting the information signal. The output of filter 41 is applied to a full-wave rectifier 42 receiving an off-set voltage from noise bias unit 43. The off-set voltage serves to eliminate low frequency noise induced by reader 12.

The output of rectifier 42 is applied to a logarithmic normalizer 44 and to a peak follower 45. Normalizer 44 also receives an input from a manually set compression control unit 46 which, in the preferred embodiment described herein, sets the logarithmic reference point of the normalizer to compress the range of signal variation by a factor of two. The output of normalizer 44 is supplied to a DC restore unit 47 which eliminates amplifier off-sets appearing in the data signal. The output of unit 47 in turn is applied to a comparator 48.

Comparator 48 generates a logic one pulse when the amplitude of a data signal is greater than a threshold voltage. The digital output of comparator 48 is applied to a clock synchronizer 49, which synchronizes the transfer of data with a 1 MHz clock signal provided by timing logic unit 14 of FIG. 1. The data is transferred from synchronizer 49 to an NRZ (non-return-to-zero) converter 50.

Peak follower 45 receives 20 channels of linear or unnormalized data from rectifier 42 and similar rectifiers associated with 19 other data channels, and selects that channel having the strongest data signal. The selected data signal is forwarded to a peak detector 51 and to a logarithmic normalizer 52. Normalizer 52 also receives an input from a manually set compression control unit 53, and applies a normalized data signal through a DC restore unit 54 to an adaptive threshold unit 55.

Adaptive threshold unit 55 further receives a voltage bias from an adjustable static threshold unit 56. The static threshold unit effectively controls the dynamic range of the data lift system, thereby eliminating amplifier noise and video signals generated in response to the sensing of magnetic characters printed on the opposite or remote face of a document.

The adaptive threshold unit 55 provides an adaptive threshold having a magnitude dependent upon the peak of the strongest signal detected by the peak follower 45 and the magnitude of the static threshold provided by unit 56. If the selected peak amplitude exceeds the static threshold, the adaptive threshold is set equal to approximately 20% of the peak amplitude. Thus, the peak amplitude of one data channel is used to set the adaptive threshold for all twenty channels of a read head. If the peak amplitude is less than the static threshold, however, the adaptive threshold is set equal to approximately 20% of the static threshold. The output of threshold unit 55 is applied to comparator 48 for comparison with the output of DC restore unit 47, and applied along control lines 57 to like comparators processing data signals received from the remaining nineteen data channels leading from a MICR read head.

Peak detector 51 provides a pulse having a width proportional to the period of the unnormalized full-wave rectified data signal received from peak follower 45. The detector pulse is sensed by a width discriminator 58, which signals the occurrence of a pulse width equal to or exceeding 7 microseconds. The output of width discriminator 58 is applied to one input of an AND gate 59, a second input of which is connected to the output of an OR gate 60. The output of gate 59 is applied to a phase lock control unit 61.

One input of OR gate 60 is supplied by the output of comparator 48. OR gate 60 also receives 19 other inputs on lines 62 leading from comparators associated with the remaining data channels of the read head. When the output of any of the comparators transitions to a logic one level, AND gate 59 is enabled by OR gate 60 and the discriminator 58 output is applied to control unit 61.

Upon being enabled by a Document Window signal generated by external transport electronics, unit 61 generates a data sample signal on a control line 64 which is synchronized with the output of discriminator 58. In addition, unit 61 generates a data clock signal on a control line 65 delayed 10 microseconds from the data sample signal. The data sample and data clock signals also are applied to control lines 66 and 67, respectively, which lead to like systems servicing the remaining data channels of the read head.

In response to the data sample signal on line 64 and the data clock signal on line 65, converter 50 samples the output of comparator 48. The sampled data is converted in an NRZ (non-return-to-zero) data format, and supplied to a data line 68 leading to synchronization unit 23 of FIG. 1.

FIG. 4

Figure 4:
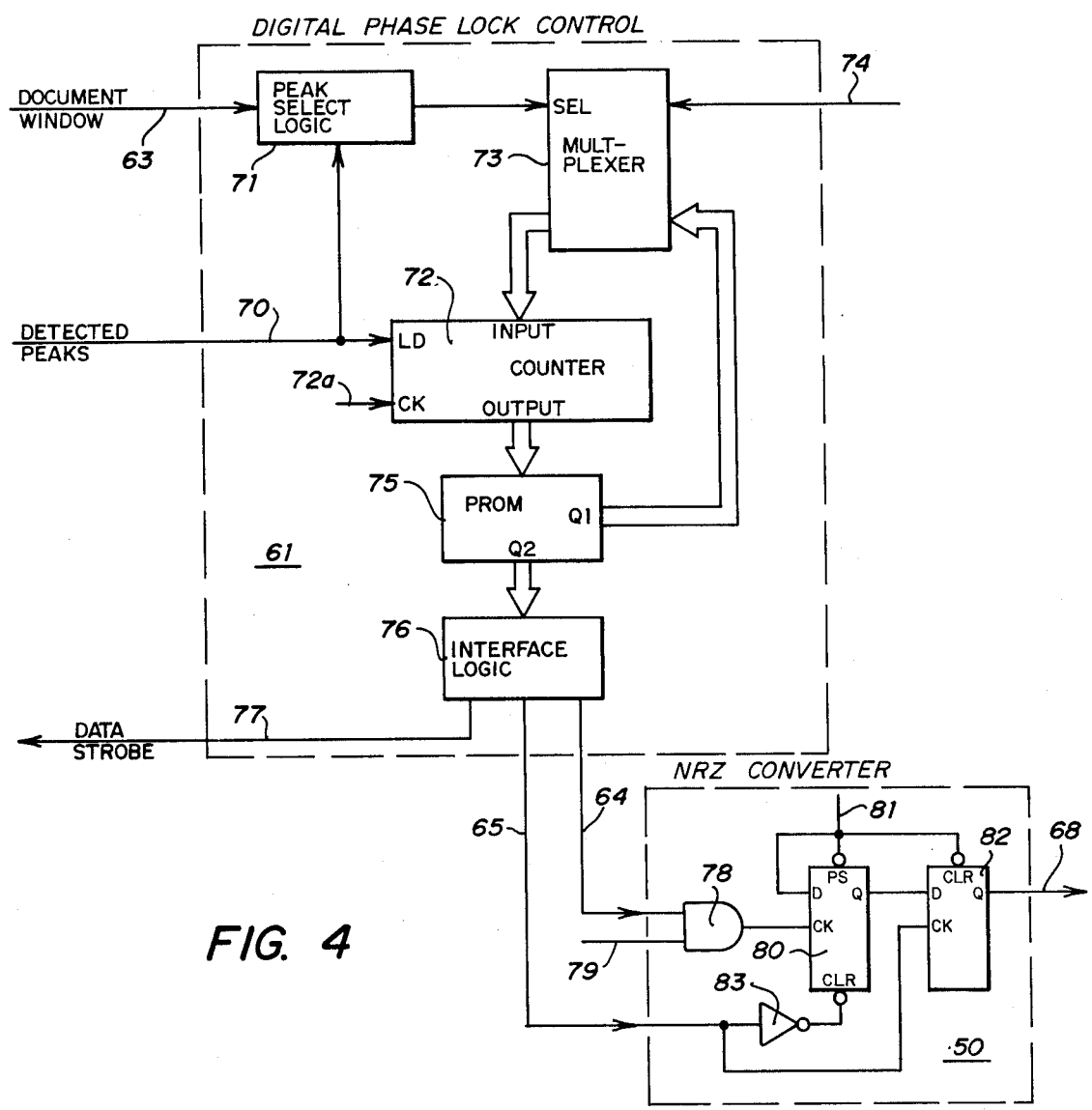
FIG. 4 is a functional block diagram of the digital phase lock and the NRZ converter units of FIG. 3.

FIG. 4 is a functional block diagram of the digital phase lock control unit 61 and the NRZ converter 50 of FIG. 3.

The output of AND gate 59 of FIG. 3 is applied by way of a data line 70 to one input of a peak selection logic unit 71, and to the load (LD) input of a synchronous four bit counter 72. The clock input to counter 72 is connected to a control line 72a leading to a 1 MHz output of timing logic 14 of FIG. 1. Logic unit 71 is enabled by the document window signal on a control line 63. Upon the occurrence of a first pulse on line 70 during an initial reading of a document, logic unit 71 selects a channel in a multiplexer 73 to a voltage level applied by way of a control line 74. Input on line 74 is applied through multiplexer 73 to the input of counter 72. For all line 70 pulses that occur after the initial pulse, however, multiplexer 73 is selected to a first output Q1 of a 8 × 32 bit programmable read only memory (PROM) 75 which is addressed by the output of counter 72.

The feedback loop comprising counter 72, multiplexer 73 and the Q1 output of PROM 75 performs a phase lock operation. For example, upon the occurrence of a count between zero and seven at the output of counter 72, the PROM effects a counter hold for a single count period. For counts between eight and fifteen, however, the PROM effects a single count advance at the counter output.

PROM 75 further decodes the counter 72 output to provide a sample window signal at its Q2 output comprising a logic one pulse occurring between the counts of eleven and fourteen. The sample window signal is applied to an interface logic unit 76 which supplies the data sample signal and the data clock signal to NRZ converter 50 by way of control lines 64 and 65, respectively. Logic unit 76 also supplies a data strobe signal by way of a control line 77 to synchronization unit 23 of FIG. 1. The leading edge of the data clock signal occurs 10 microseconds after the leading edge of the data sample signal. The leading edge of the data strobe signal, however, occurs eight microseconds after the leading edge of the data sample signal.

Peak select logic unit 71, counter 72, multiplexer 73, PROM 75 and logic unit 76 comprise digital phase lock control unit 61 of FIG. 3. The unit 61 phase locks the data sample signal on line 64 to the data peak pulse train on line 70.

The data sample signal on line 64 is applied to one input of an AND gate 78, the second input of which is supplied by clock synchronizer 49 of FIG. 3 by way of a data line 79. The output of gate 78 is applied to the clock input of a D-type flip-flop 80.

The D input of flip-flop 80 is connected to a +5 volt source on line 81, to the complementary preset (PS) input of the flip-flop, and to the complementary clear (CLR) input of a D-type flip-flop 82. The complementary clear input of flip-flop 80 is connected to the output of an inverter 83, the input of which is connected to control line 65. The Q output of flip-flop 80 is connected to the D input of flip-flop 82, the clock input of which is connected to line 65. The Q output of flip-flop 82 in turn is connected to data line 68 leading to synchronizer 23 of FIG. 1.

AND gate 78, flip-flops 80 and 82, and inverter 83 comprise NRZ converter 50 of FIG. 3.

In operation, when a data sample signal is reveived concurrently with digitized data at the inputs of AND gate 78, flip-flop 80 is clocked to place a logic one at the Q output of the flip-flop. Upon the occurrence of a data clock pulse on line 65, the logic one pulse at the Q output of flip-flop 80 is clocked to the Q output of flip-flop 82, and flip-flop 80 is cleared. The Q output of flip-flop 80 remains at a logic zero state until data again occurs within a data sample window. Further, the Q output of flip-flop 80 is not clocked through flip-flop 82 again until a next data clock pulse occurs on line 65. The Q output of flip-flop 82 thus remains constant until a second data clock signal is received.

FIG. 5

Figure 5:
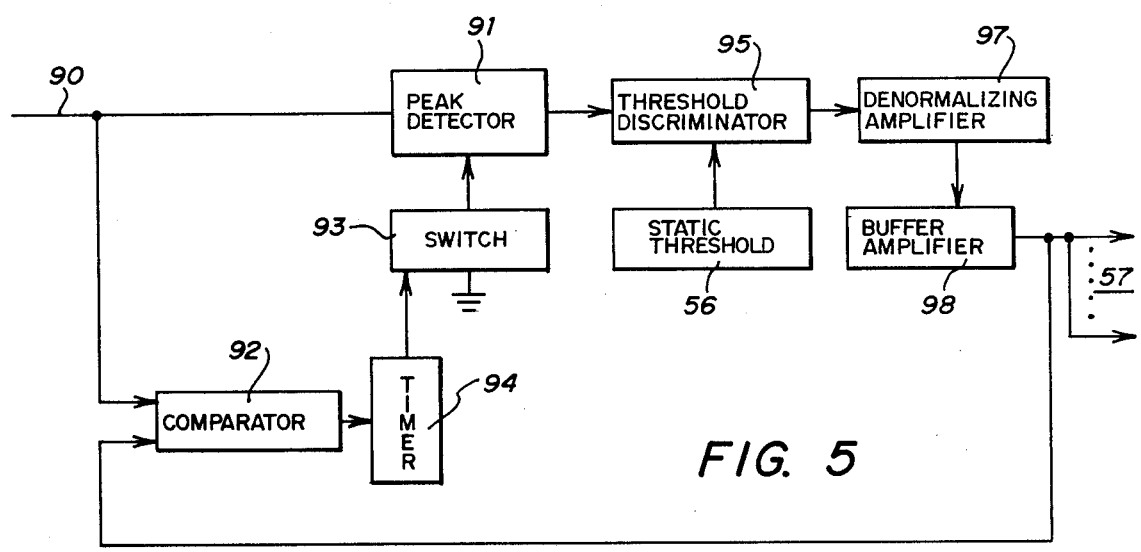
FIG. 5 is a functional block diagram of the adaptive threshold unit comprising the system of FIG. 3.

FIG. 5 illustrates in functional block diagram form the adaptive threshold unit 55 of FIG. 3.

A data signal selected by peak follower 45 of FIG. 3 is applied along a data line 90 leading from DC restore unit 54 to a peak detector 91, and to one input of a comparator 92. The peak detector unit 91 includes a dual discharge path controlled by a switch 93 connected to ground. When switch 93 is in a closed position, unit 91 is placed in a fast discharge mode. When the switch is open, however, unit 91 is placed in a slow discharge mode. The operation of switch 93 is controlled by a timer 94, the input of which is connected to the output of comparator 92.

The output of unit 91 is applied to a threshold discriminator 95, which also receives a threshold voltage from a static threshold unit 56. The output of discriminator 95 is applied through a denormalizing amplifier 97 and a buffer amplifier 98 to one input of comparator 92. The output of amplifier 98 also is applied to comparator 48 of FIG. 3 and to control lines 57 leading to systems similarly processing the data signals of 19 other data channels interfacing with a MICR read head of reader 12.

In operation, a data signal on data line 90 is held at the peak value by unit 91, and applied to comparator 92. If the amplitude of the input data signal exceeds the magnitude of the threshold value provided by buffer amplifier 98, comparator 92 issues a pulse which resets timer 94. Switch 93 thereby is placed in an open position, and unit 91 enters into a slow discharge mode. When timer 94 counts to a maximum value, the timer issues a pulse to close switch 93 and place unit 91 in a fast discharge mode. During the period that the timer 94 is counting, however, the peak value held by unit 91 is OR'd by discriminator 95 with the threshold voltage provided by static threshold unit 56 of FIG. 3. If the peak value is of a larger magnitude than the static threshold voltage, the peak value is applied through amplifiers 97 and 98 to comparator 92. If the static threshold voltage exceeds the magnitude of the peak value, however, the static threshold voltage is applied through amplifiers 97 and 98 to comparator 92.

FIG. 6

Figure 6:
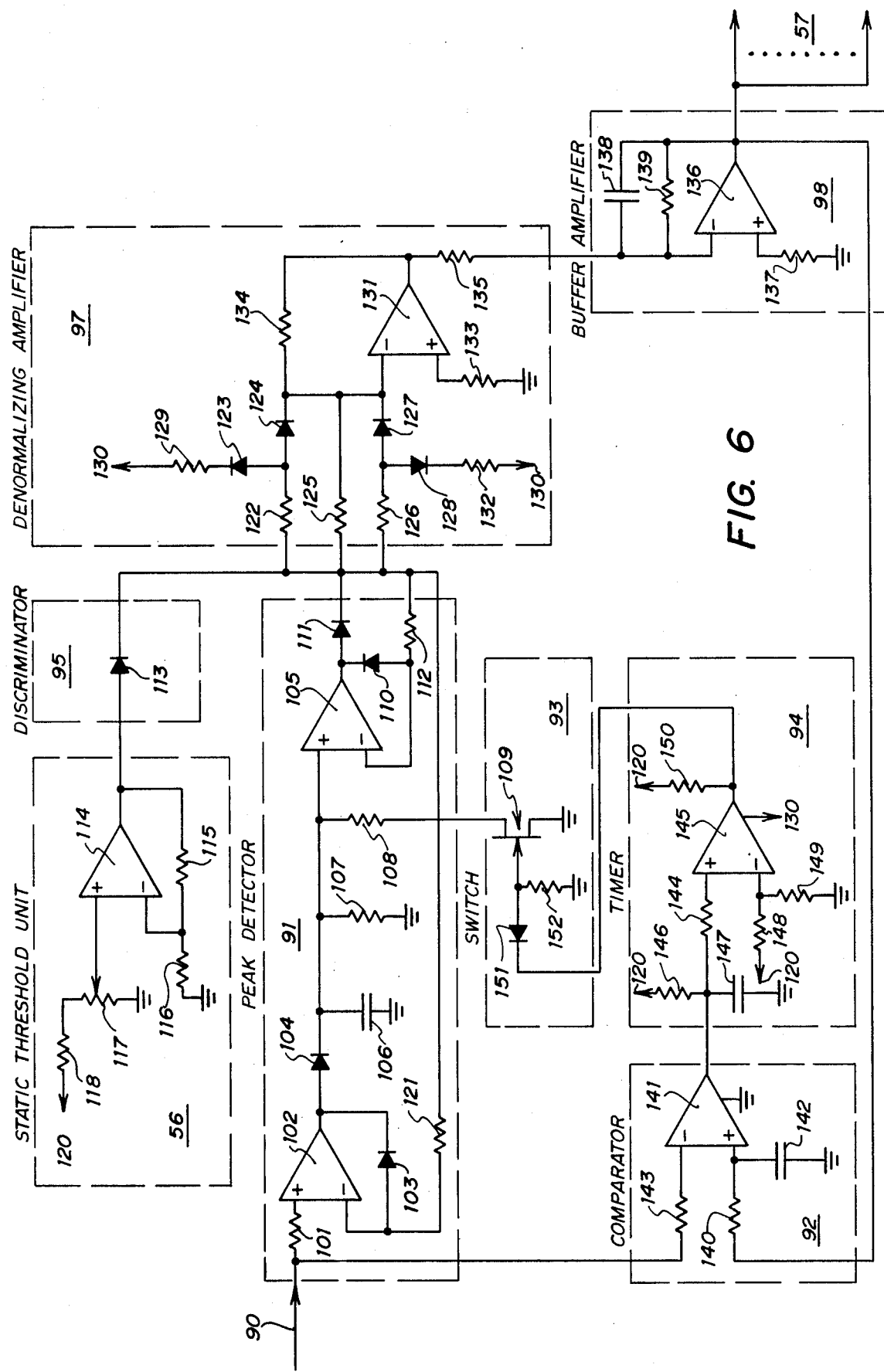
FIG. 6 is a detailed electrical schematic diagram of the adaptive threshold unit of FIG. 5.

FIG. 6 is a detailed electrical schematic diagram of the adaptive threshold unit 55 of FIG. 5.

A data signal is applied by DC restore unit 54 of FIG. 3 along data line 90 and through a 1.0 K-ohm resistor 101 to the positive input of a differential amplifier 102. The output of amplifier 102 is connected to the cathode of a diode 103, the anode of which is connected to the negative input of amplifier 102. The output of amplifier 102 also is connected to the anode of a diode 104 having a cathode connected to the positive input of a differential amplifier 105.

The positive input of amplifier 105 also is connected to one terminal of a 1000 picofarad capacitor 106 having a second terminal connected to ground, connected through a 470 K-ohm resistor 107 to ground, and connected through a 270 K-ohm resistor 108 to the drain of a junction field effect transistor (FET) 109. The output of amplifier 105 is connected to the cathode of a diode 110 and to the anode of a diode 111. The cathode of diode 111 is connected through a 10.0 K-ohm resistor 112 to the anode of diode 110 and to the negative input of amplifier 105.

The cathode of diode 111 also is connected to the cathode of a diode 113 having an anode connected to the output of a differential amplifier 114. The output of amplifier 114 in addition is connected through a 10.0 K-ohm resistor 115 and a 10.0 K-ohm resistor 116 to ground, and through resistor 115 to the negative input of the amplifier. The positive input of amplifier 114 is connected to the arm of a potentiometer comprising a 1.0 K-ohm resistor 117, one terminal of which is connected to ground. The second terminal of resistor 117 is connected through a 10.0 K-ohm resistor 118 to a +15 volt source 120.

The cathode of diode 113 further is connected through a 10.0 K-ohm resistor 121 to the negative input of amplifier 102, through a 34.0 K-ohm resistor 122 to the anodes of diodes 123 and 124, through a 24.9 K-ohm resistor 125 to the cathode of diode 124, and through a 24.9 K-ohm resistor 126 to the anodes of diodes 127 and 128.

Amplifiers 102 and 105, diodes 103, 104, 110 and 111, capacitor 106, and resistors 101, 107, 108, 112 and 121 comprise peak detector 91 of FIG. 5. Amplifier 114, resistors 115, 116 and 118, and the potentiometer including resistor 117 comprise static threshold unit 56. In addition, diode 113 comprises discriminator 95.

The cathode of diode 123 is connected through a 422 K-ohm resistor 129 to a −15 volt source 130. The cathode of diode 124 is connected to the cathode of diode 127 and to the negative input of a differential amplifier 131. The cathode of diode 128 is connected through a 200 K-ohm resistor 132 to source 130.

The positive input to amplifier 131 is connected through a 4.99 K-ohm resistor 133 to ground, and the output of the amplifier is connected through a 4.99 K-ohm resistor 134 to the negative input of the amplifier. The output of amplifier 131 further is connected through a 10.0 K-ohm resistor 135 to the negative input of a differential amplifier 136. Amplifier 131 and its associated network comprise denormalizing amplifier 97 of FIG. 5.

The positive input to amplifier 136 is connected through a 4.99 K-ohm resistor 137 to ground, and the output of the amplifier is connected to control lines 57 leading to the data signal processing circuits servicing the data channels of a MICR read head. The output of amplifier 136 also is connected to one terminal of a 27 picofarad capacitor 138 having a second terminal connected to the negative input of the amplifier, and through a 10.0 K-ohm resistor 139 to the negative input of the amplifier. In addition, the output of amplifier 136 is connected through a 2.0 K-ohm resistor 140 to the positive input of a comparator 141. Amplifier 136, capacitor 138, and resistors 137 and 139 comprise buffer amplifier 98 of FIG. 5.

The positive input of comparator 141 also is connected through one terminal of a 47 picofarad capacitor 142 having a second terminal connected to ground. The negative input to the comparator is connected through a 2.0 K-ohm resistor 143 to data line 90. The output of comparator 141 is connected through a 1.0 K-ohm resistor 144 to the positive input of a comparator 145, through a 39.0 K-ohm resistor 146 to voltage source 120, and to one terminal of a 1000 picofarad capacitor 147 having a second terminal connected to ground. An output select terminal of comparator 141 is connected to ground. Comparator 141, capacitor 142, and resistors 140 and 143 comprise comparator 92 of FIG. 5.

The negative input to comparator 145 is connected through a 10.0 K-ohm resistor 148 to voltage source 120, and through a 5.10 K-ohm resistor 149 to ground. The output of comparator 145 is connected through a 10.0 K-ohm resistor 150 to voltage source 120, and to the cathode of a diode 151. An output select terminal of comparator 145 is connected to the −15 volt source 130. Comparator 145, capacitor 147, and resistors 144, 146, 148, 149 and 150 comprise timer 94 of FIG. 5.

The anode of diode 151 is connected to the gate of FET 109, and through a 27.0 K-ohm resistor 152 to ground. The source of FET 109 also is connected to ground. FET 109, diode 151, and resistor 152 comprise switch 93 of FIG. 5.

In operation, a data signal selected by peak follower 45 of FIG. 3 is normalized, biased and applied along data line 90 to the positive input of amplifier 102 and to one input of comparator 92.

The differential amplifiers 102 and 105 comprising peak detector 91 form a single unit gain amplifier, and amplifier 105 in addition is connected as a unit gain amplifier. While diode 104 is forward biased, therefore, capacitor 106 is charged, and amplifier 105 provides a signal reflecting the charge voltage across the capacitor. In addition, the amplifiers 102 and 105 act in combination to equalize the two inputs to amplifier 102. When the inputs to amplifier 102 are equalized, the charge voltage across capacitor 106 accurately reflects the normalized data signal applied to the input of amplifier 102.

A static threshold is set by the potentiometer including resistor 117. Discriminator 95 comprised of diode 113 effectively OR's the threshold voltage at the output of amplifier 114 with the output of amplifier 105. The signal having the greater magnitude is applied to the denormalizing amplifier 97.

Amplifier 97 is a non-linear amplifier which removes the logarithmic effect from a logarithmically normalized data signal. The denormalized data signal applied to buffer amplifier 98 is a threshold voltage approximately equivalent to either 20% of the static threshold, or 20% of the peak value of the strongest linear video signal appearing on any of 20 channels comprising one MICR read head or reader 12.

Comparator 92 compares the normalized data signal on line 90 with the threshold voltage of buffer amplifier 98. When the magnitude of the normalized data signal exceeds that of the threshold, the comparator output is tied to ground. During the period that the threshold voltage is greater than the normalized data signal, however, the comparator output is open and capacitor 147 is charged by +15 volt source 120.

When the voltage across capacitor 147 exceeds the +5 volt threshold voltage applied to the negative input of comparator 145, the output of the comparator is open to allow the +15 volt source to be applied to diode 151 of switch 93. As FET transistor 109 is a junction FET which is activated when no voltage exists across the gate to source junction, the FET is placed in an operating mode and capacitor 106 discharges through the fast discharge path provided by resistors 107 and 108. When the voltage across capacitor 147 is less than the +5 volt threshold, however, the output of the comparator is tied to the −15 volt source 130 to place diode 151 of switch 93 in the conducting mode. The FET 109 is deactivated thereby, and a slow discharge path to ground is provided through resistor 107.

FIG. 7

The waveforms of FIG. 7 illustrate the operation of Bessel filter 41, rectifier 42, normalizer 44, comparator 48, peak detector 51 and width discriminator 58 of FIG. 3.

A waveform 160 illustrates a representative data signal appearing at the output of Bessel filter 41. A waveform 161 illustrates the corresponding output waveform of rectifier 42, and a waveform 162 illustrates the output of normalizer 44. Superimposed upon waveform 162 is an adaptive threshold 162a generated by threshold unit 55 of FIG. 3. A waveform 163 illustrates the output of comparator 48 upon comparing waveform 162 with adaptive threshold 162a.

The output of peak detector 51 is illustrated by a waveform 164. As may be seen by inspection of waveforms 161 and 164, the output of the peak detector transitions to a logic one level when the slope of waveform 161 is positive, and transitions to a logic zero level when the slope of waveform 161 is negative.

A waveform 165 illustrates the operation of width discriminator 58. Discriminator 58 issues a 1 microsecond pulse at the trailing edge of those waveform 164 pulses having a pulse width equal to or greater than a preset width criteria. Each pulse of waveform 165 occurs at a peak of waveforms 160-162.

FIG. 8

FIG. 8 is a timing and output waveform diagram illustrating the operation of normalizer 44, comparator 48, clock synchronizer 49, NRZ converter 50 and digital phase lock control unit 61 of FIG. 3.

Waveform 170 illustrates a representative output of normalizer 44, and waveform 171 illustrates the output of comparator 48 in response to the waveform 170. Waveform 172 illustrates the data sample signal generated by phase lock control unit 61 on line 64 of FIG. 3. Waveform 173 illustrates the data clock signal generated by unit 61 on line 65. By inspection, it may be seen that the positive-going pulses of waveform 172 occur at the peaks of the waveform 170, and that the positive-going pulses comprising waveform 173 occur between such peaks.

Waveform 174 illustrates the data strobe generated by unit 61 on line 77 of FIG. 4, and applied to synchronizer unit 23 of FIG. 1. The pulses of waveform 174 lead the pulses of waveform 173 by approximately 2 microseconds.

Waveform 175 illustrates that part of the output of clock synchronizer 49 which is sampled and stored in flip-flop 80 of FIG. 4. The positive-going pulses comprising waveform 175 occur at the Q output of flip-flop 80 a delayed time after a logic one state of waveform 171 appears within a data sample window defined by the positive-going pulses of waveform 172. The occurrence of a waveform 173 pulse at the CLR input of the flip-flop 80, however, resets the flip-flop as illustrated by the trailing edges of the waveform 175 pulses.

Waveform 176 is an illustration of the NRZ output of converter 50. It may be seen by inspection that the leading edge of a positive-going pulse comprising waveform 176 occurs when a positive-going pulse of waveform 175 is present during the time of occurrence of a pulse comprising waveform 173. The trailing edge of the positive-going pulse of waveform 176 occurs when no positive-going pulse of waveform 175 is present during the time of occurrence of a pulse of waveform 173.

FIG. 9

Figure 9:
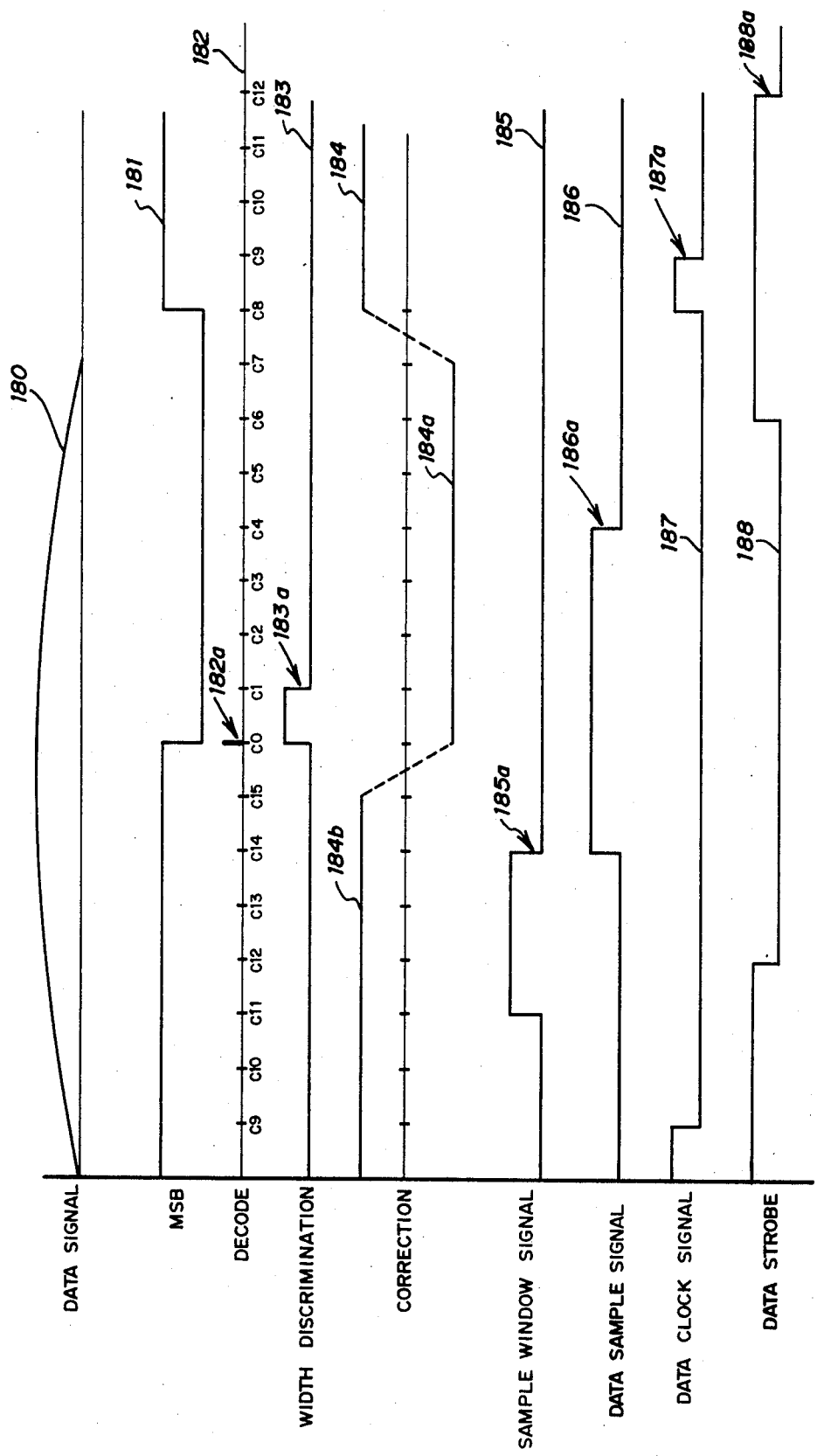

FIG. 9 is a timing and output waveform diagram illustrating the operation of the phase lock control unit 61 of FIG. 4.

Waveform 180 illustrates a data signal at the output of peak follower 45 of FIG. 3, and waveform 181 illustrates the most significant bit (MSB) output of counter 72. Waveform 182 illustrates a decoding of the four bit output of counter 72, wherein the transition between a count of 15 (C15) and a count of zero (CO) is designated by a pulse 182a. Waveform 183 illustrates the output of width discriminator 58 of FIG. 3, wherein pulse 183a indicates the occurrence of a data signal peak as illustrated by waveform 180.

Each MICR read head of reader 12 of FIG. 1 is scanned once each 16 microseconds, which is the full count period of counter 72. Thus, data may be expected at 16 microsecond intervals as illustrated by the leading edge of pulses 182a and 183a.

Counter 72 of FIG. 4 counts continuously at a 1.0 MHz rate until interrupted by a width discriminator pulse at its load input. As a load pulse can be recognized only between counts, however, the period of occurrence of width discriminator pulses may appear to vary by a single microsecond. More particularly, the leading edge of a width discriminator pulse may occur either at a count of zero or a count of fifteen as illustrated by waveform 182. If the leading edge occurs during the logic zero state of the MSB output of counter 72 as illustrated by waveform 181, a −1 count correction is made as illustrated by a portion 184a of waveform 184. The width discriminator 58 is synchronized thereby with the 1.0 MHz clock driving counter 72. If the leading edge of the width discriminator pulse occurs at a count 15, however, a +1 count correction as illustrated by curve portion 184b is made.

PROM 75 is constructed to effect the count corrections illustrated by waveform 184 by reloading counter 72 with a count addressed by the output of the counter. No such correction occurs, however, until a pulse from width discriminator 58 is received at the LD input of the counter. Upon receiving such a pulse, PROM 75 reloads counter 72 with a current count to effect a loss of one count, or reloads the counter with a current count plus two to effect an advance of one count.

Waveform 185 illustrates a PROM 75 output wherein a pulse 185a normally occurs between the counts of 11 and 14. Since pulse 185a also occurs during the +1 count correction period of curve portion 184a, an eleven count could be skipped and pulse 185a could begin at a 12 count.

Upon the occurrence of a leading edge of pulse 185a at the output of PROM 75, interface logic unit 76 generates waveforms 186, 187 and 188. Waveform 186 illustrates the data sample signal on line 64; waveform 187 illustrates signal on line 65, and waveform 188 illustrates the data strobe signal on line 77. The leading edge of pulse 186a of waveform 186 occurs 3 microseconds or three counts after the leading edge of pulse 185a, and the leading edge of a pulse 187a of waveform 187 occurs 13 microseconds after the leading edge of pulse 185a. Further, the leading edge of a pulse 188a of waveform 188 occurs 11 counts or 11 microseconds after the leading edge of pulse 185a.

In the setting of the data lift operations above described, the present invention operates to effect a merging of the two data streams, as will now be described.

FIG. 10

Figure 10:
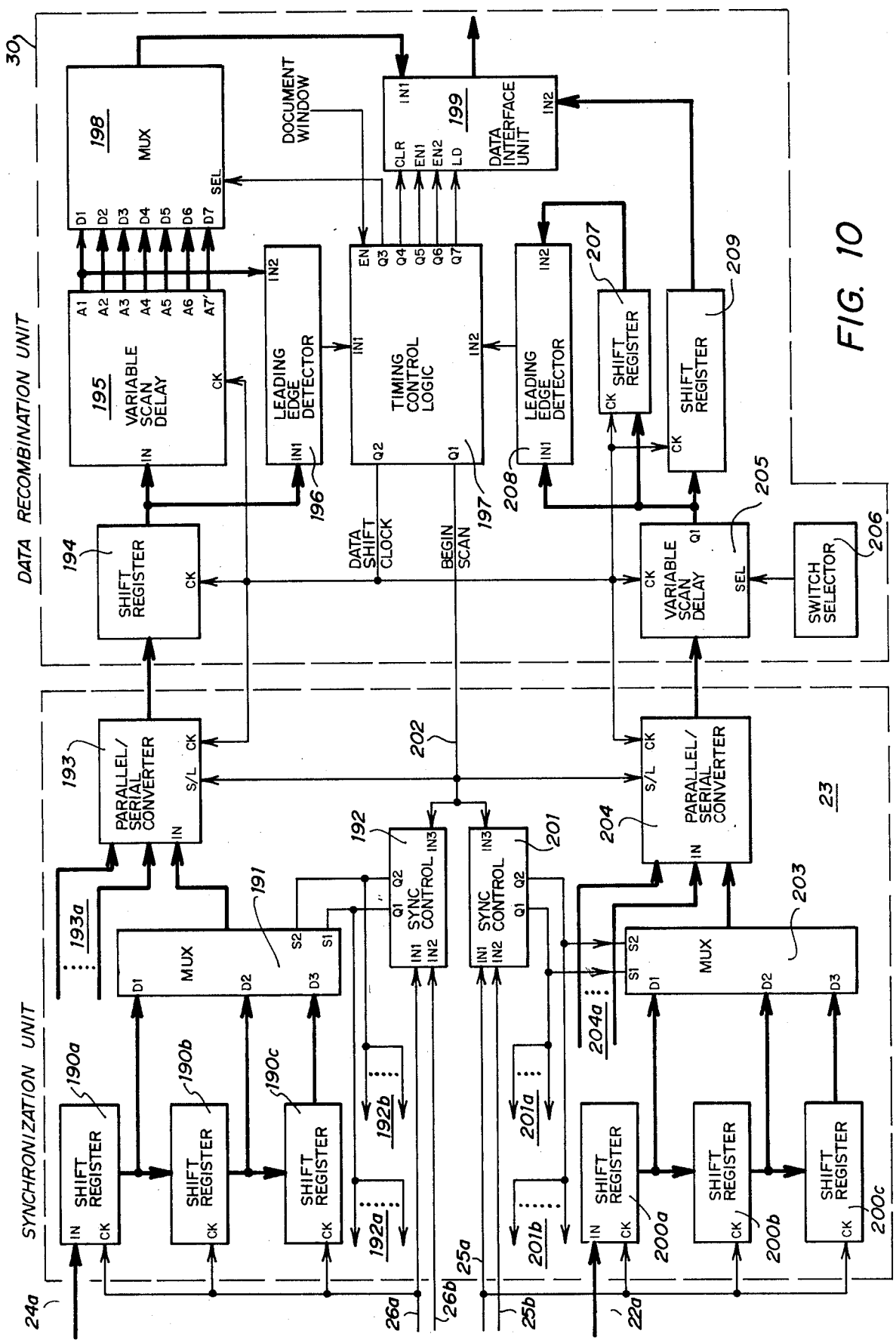
FIG. 10 is a functional block diagram of the synchronizaton and data recombination units of FIG. 1.

FIG. 10 illustrates in functional block diagram form the synchronization unit 23 and the data recombination unit 30 of FIG. 1.

One of twenty data channel outputs of analog processor unit 21 is applied along data channel 24a to the input of a shift register 190 having three serially stacked twenty bit data registers 190a–190c. The three register outputs are applied to the D1–D3 inputs of a three-to-one multiplexer 191. The clock inputs of data registers 190a–190c are connected to line 26a leading to a data strobe output of processor unit 21. Line 26a also is connected to the IN1 input of an even channel synchronization control unit 192.

The IN2 input of unit 192 is connected to line 26b leading to a data peak output of processor 21. The select control signals generated by unit 192 at the Q1 and Q2 outputs are applied to the respective select inputs S1, S2 of multiplexer 191. The select control signals control the selection of one of inputs D1–D3 of the multiplexer for transfer of data to a parallel-to-serial converter 193.

The serial output of converter 193 is connected to the input of a shift register 194 providing a delay of 129 scan periods, wherein one scan period is equal to one-half the period of the 30.8 KHz write signal.

It is to be understood that the select control signals at the Q1 and Q2 outputs of control unit 192 also are applied along control line sets 192a and 192b, respectively, to 19 other multiplexers servicing the remaining even data channels of analog processor unit 21. The 19 serial outputs to those multiplexers are applied in parallel along data lines 193a to corresponding inputs of converter along data line 193a to corresponding inputs of converter 193.

The output of shift register 194 is applied to a variable scan delay unit 195 providing one to seven scan period delays, and to the IN1 input of a leading edge detector 196 which signals the occurrence of even data to a timing and control logic unit 197. The seven delay outputs A1–A7 of unit 195 are applied to seven corresponding inputs D1–D7, respectively, of a seven-to-one multiplexer 198. In addition, the single scan period delay provided at the A1 output of unit 195 is applied to the IN2 input of detector 196. The output of multiplexer 198 is applied to the IN1 input of a data interlace unit 199.

One of 20 odd data channel outputs of analog processor unit 20 of FIG. 1 is applied along a data channel 22a to the input of a shift register comprised of three serially stacked data registers 200a–200c. In addition, processor unit 20 provides a data strobe signal by way of line 25a to the clock (CK) inputs of registers 200a–200c and to the IN1 input of an odd channel synchronization control unit 201. Processor unit 20 also provides a data peak signal by way of line 25b to the IN2 input of unit 201. The IN3 input of unit 201 is connected to the IN3 input of control unit 192, and by way of a control line 202 to an output Q1 of logic unit 197. The Q1 and Q2 outputs of unit 201 are connected to respective select inputs S1, S2 of a three-to-one multiplexer 203, the D1–D3 inputs of which are connected to corresponding outputs of registers 200a–200c. The output of multiplexer 203 is applied to one of twenty inputs of a parallel-to-serial converter 204.

It is to be understood that the Q1 and Q2 outputs of control unit 201 also are applied by way of control line sets 201a and 201b to 19 other multiplexers servicing the remaining 19 odd data channels of analog processor unit 20. The 19 serial outputs of the multiplexers are applied along data lines 204a to corresponding inputs of converter 204.

Continuing with the description of FIG. 10, the shift-/load (S/L) input of converter 204 is connected to the S/L input of converter 193. The serial output of converter 204 is applied to a variable scan delay unit 205, which provides a delay of from zero to two scan periods. Shift register 190, data registers 200a–200c, control units 192 and 201, multiplexers 191 and 203, and converters 193 and 204 comprise synchronization unit 23 of FIG. 1.

A switch selector unit 206 provides a manually selectable control pulse to the select (SEL) input of delay unit 205. Either zero, one, or two scan delays may be selected with unit 206 to compensate for mechanical misalignments of the read heads of reader 12. The odd data channel signals appearing at the Q1 output of unit 205 are applied to a one scan period delay shift register 207, and to the IN1 input of a leading edge detector 208. The Q1 output of unit 205 also is applied to the input of a shift register 209 providing a fixed delay of four scan periods.

The output of register 209 is applied to the IN2 input of interlace unit 199. The clock input of register 209 is connected to the clock inputs of shift register 207, delay unit 205, converter 204, shift register 194, converter 193, delay unit 195, and to the Q2 output of logic unit 197. Shift register 209 effectively centers the time of occurrence of the odd channel data to the midpoint of the time period controlled by delay unit 195. Either late or early occurring even channel data thereby may be synchronized through the control of multiplexer 198.

The output of shift register 207 is connected to the IN2 input of detector 208. The output detector 208 in turn is applied to the IN2 input of control logic unit 197, which also receives a Document Window signal at its enable (EN) input from external transport electronics. The Q3 output of unit 197 is connected to the select (SEL) input of multiplexer 198, and the Q4 output is connected to the clear (CLR) input of interlace unit 199. The Q4 and Q5 outputs of unit 197 are connected to the even enable (EN1) and odd enable (EN2) inputs, respectively, of interlace unit 199. The Q7 output of unit 197 is connected to the load (LD) input of unit 199.

Shift registers 194, 207 and 209, switch selector unit 206, delay units 195 and 205, detectors 196 and 208, logic unit 197, multiplexer 198, and interlace unit 199 comprise data recombination unit 30 of FIG. 1.

In operation, data applied along even data channel 24a is applied to the data input of shift register 190. Upon the occurrence of a data strobe on line 26a, the contents of register 190a are clocked into register 190b, and the contents of the register 190b are clocked into register 190c. In addition, the data on channel 24a is clocked into register 190a to provide future, present and past even channel data signals in serial order.

Control unit 192 monitors the data strobe signal on line 26a, the data peak signals on line 26b and a Begin Scan signal generated by control logic unit 197 on line 202 to make a proper selection of registers for the transfer of data. Ideally, data strobe and Begin Scan signals occur in an alternating fashion. The one count corrections effected by digital phase lock control unit 61 of FIG. 4, however, causes a variation of ±1 microsecond to occur in the data strobes.

Where only one Begin Scan signal occurs between two adjacent data strobe signals, data register 190b is selected. However, if two Begin Scan signals occur between two adjacent data strobe signals, then register 190a is selected. If no Begin Scan signal occurs between adjacent data strobe signals, the register 190c is selected. Further, whenever the control unit 192 detects an intercharacter space, an absence of data peaks on line 26b for a period equal to 14 Begin Scan periods, the logic unit resets to select the register 190b. By this means, two or more asynchronous data sources can be sampled independently and synchronized without the loss of data.

The selected register contents are transferred through multiplexer 191 to parallel-to-serial converter 193. Upon the occurrence of a Begin Scan signal at the shift/load input of the converter, the output of multiplexer 191 and the data signals on data lines 193a are loaded into registers internal to the converter. A parallel-to-serial conversion then takes place between the occurrence of Begin Scan signals.

The serial output of converter 193 is applied to shift register 194. The shift register comprises 2580 bits for a delay of 129 scan periods, each twenty bits corresponding to one vertical scan of the MICR read heads.

Upon the occurrence of a leading edge of a Begin Scan signal, logic unit 197 generates a data shift clock signal comprising a 2.0 MHz burst of 20 pulses. The clock signal controls the operation of the scan delay units for both the even and odd data channel operations. Under the control of the data shift clock signal, data is transferred from shift register 194 to variable delay unit 195. The seven outputs of delay unit 195 each represent a 20 bit or single scan period delay. Multiplexer 198 under the control of logic unit 197 selects the output of delay unit 195 to be forwarded to interlace unit 199. Depending upon the output of delay unit 195 that is selected, a delay of one to seven scans may be applied to the even channel data signal.

Asynchronous to the operation of the even data channel process, odd channel data is applied along channel 22a to data registers 200a–200c. As before described, upon the occurrence of a data strobe signal on line 25a, the contents of register 200a are stored into register 200b, and the contents of register 200b are stored into register 200c. Further, the data on channel 22a is clocked into the register 200a.

Control unit 201 monitors the data strobe signals on line 25a, the data peak signals on line 25b and the Begin Scan signal on line 202 to make a proper selection of registers for the transfer of data. The operation of control unit 201 is identical to that of control unit 192.

Under the control of control unit 201, multiplexer 203 is selected to one of three inputs D1–D3 from shift registers 200a–200c. The selected input is transferred through multiplexer 203 to parallel-to-serial converter 204. Upon the occurrence of a Begin Scan signal at the shift/load input of the converter, the output of multiplexer 203 and the data signals on data lines 204a are loaded into registers internal to the converter. A parallel-to-serial conversion then takes place between the occurrence of Begin Scan signals.

The serial output of converter 204 is applied to variable scan delay unit 205, the magnitude of the delay being controlled by switch selector 206. Under the control of the data shift clock signal generated by control logic unit 197, data is transferred from delay unit 205 to the edge detector 208, through shift register 207 to a second input of detector 208, and through shift register 209 to the IN2 input of interlace unit 199.

Edge detectors 196 and 208 sense the leading edge of even and odd channel data signals, respectively, and upon detecting a leading edge issue pulses to control logic unit 197.

Unit 197 determines the time difference between the pulses generated by detectors 196 and 208, and selects multiplexer 198 to the output of delay unit 195 which will synchronize the occurrence of the odd and even data signals. Detectors 196 and 208, and control logic unit 197 thereby provide a fine synchronization adjustment supplementing that provided by shift registers 194 and 209, and delay units 195 and 205.

If pulses are generated by detectors 196 and 208 simultaneously, the even data channel signals are delayed an additional four scans to coincide with the fixed four scan delay provided by shift register 209. If the even data channel signals occur one scan earlier than the odd data channel signals, control logic unit 197 selects multiplexer 198 to an additional delay of five scans. Further, if the even data channel signals occur one scan period later than the odd data channel signals, control logic unit 197 commands a delay of three scan periods.

After the delay corrections have been made, control logic unit 197 alternately issues enable pulses at twice the data shift clock rate to the EN1 and EN2 inputs of interlace unit 199 to merge the even and odd channel data signals into a serial data stream. Unit 97 further issues a load signal after each enable pulse to reload unit 199, and issues a clear signal to purge the unit 199 buffers upon the occurrence of the 20th pulse comprising the data shift clock signal.

FIG. 11

Figure 11:
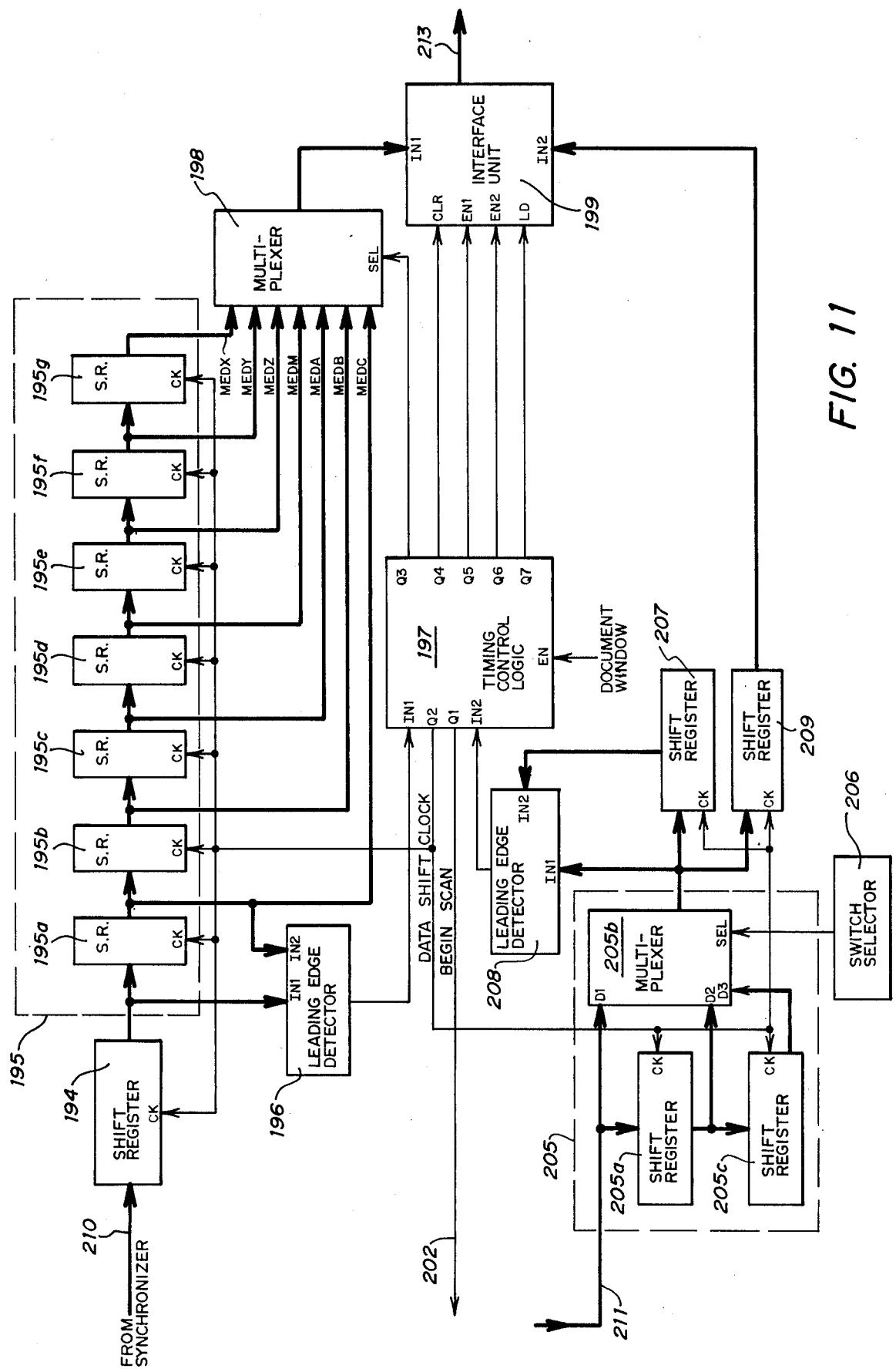
FIG. 11 is a more detailed functional block diagram of the data recombination unit of FIG. 10.

FIG. 11 is a detailed functional block diagram of the data recombination unit 30 of FIG. 10.

Even channel serial data is supplied by converter 193 of FIG. 10 to a data line 210 leading to the input of shift register 194. Shift register 194 provides a 129 scan period delay, 16 microseconds per scan period. The output shift register 194 is applied to leading edge detector 196 and to the input of a twenty bit shift register 195a. The twenty bit delay is equivalent to one vertical scan of a read head or 16 microseconds. The output of shift register 195a is applied to the input of a twenty bit shift register 195b and to a second input of detector 196. The output of shift register 195a further is connected to one input of multiplexer 198, and the output of detector 196 is applied to one input of control logic unit 197.

The output of shift register 195b is connected to the input of a 20 bit shift register 195c, and to a second input of multiplexer 198. The output of shift register 195c is connected to the input of a twenty bit shift register 195d and to a third input of multiplexer 198, and the output of shift register 195d is connected to the input of a twenty bit shift register 195e and to a fourth input of multiplexer 198. Further, the output of shift register 195e is connected to the input of a 20 bit shift register 195f and to a fifth input of multiplexer 198, and the output of shift register 195f is connected to the input of a 20 bit shift register 195g and to a sixth input of multiplexer 198. The output of shift register 195g in turn is connected to a seventh input of multiplexer 198. Shift registers 195a–195g comprise variable scan dely unit 195 of FIG. 10.

The odd data channel operation occurs asynchronously with the even data channel operation. More particularly, odd channel serial data is supplied by converter 204 of FIG. 10 to a data line 211 leading to the input of a 20 bit shift register 205a, and to one input of a three-to-one multiplexer 205b. The output of shift register 205a is connected to the input of a 20 bit shift register 205c and to a second input of multiplexer 205b. The output of shift register 205c is connected to a third input of multiplexer 205b. The select input to multiplexer 205b is connected to the output of switch selector 206, and the output of multiplexer 205b is connected to the IN1 input of leading edge detector 208 and to the inputs of shift registers 207 and 209. The output of shift register 207 is connected to the IN2 input of edge detector 208. The IN1 and IN2 inputs to edge detectors 196 and 208 are delayed one scan period apart to accommodate the detection of a leading edge.

Adjacent data bits in a horizontal track of an information field occur 16 microseconds, one scan period, apart in the data stream generated by a sensor element of a MICR read head. A leading edge of a character is detected when two consecutive data bits occur in a horizontal track immediately following an intercharacter space. An intercharacter space is detected when two all white (information free) scans of the read heads occur fourteen scans after a leading edge of a character has been detected.

Shift register 205a and 205c, and multiplexer 205b comprise variable scan delay unit 205 of FIG. 10.

The outputs of edge detectors 196 and 208 are connected to the IN1 and IN2 inputs, respectively, of control logic unit 197. The Q1 and Q2 outputs of unit 197 provide Begin Scan and data shift clock signals, respectively, as before described. The Q3 output of unit 197 is connected to the SEL input of multiplexer 198, and the Q4 output is connected to the clear (CLR) input of interlace unit 199. The Q5 and Q6 outputs of logic unit 197 are connected to the even enable input (EN1) and to the odd enable input (EN2), respectively, of unit 199. The Q7 output is connected to the LD input of unit 199.

The IN1 input of interlace unit 199 is connected to the output of multiplexer 198, and the IN2 input is connected to the output of shift register 209. The output of interlace unit 199 in turn is supplied to a data line 213 leading to a character recognition system.

In operation, the odd data channel signals on data line 211 may be transferred by multiplexer 205b without delay, or delayed by one or two scan periods as controlled by switch selector unit 206. The odd data channel signals are sensed by detector 208 which generates a pulse upon detecting a leading edge of a data signal. In addition, an even data channel signal along line 210 is delayed a fixed 129 scan periods by shift register 194 and applied to detector 196, which also generates a pulse upon the detection of a leading edge of a data signal.

The times of occurrence of the pulses generated by detectors 196 and 208 are compared by control logic 197 to control the operation of both multiplexer 198 and interlace unit 199. If either or both of detectors 196 and 208 fail to detect a leading edge, no selection control signal is issued to multiplexer 198. If the detector 196 and 208 pulses are generated simultaneously, however, control logic 197 generates a selection control signal between a twentieth pulse of the data shift clock and a next Begin Scan signal. Multiplexer 198 is selected to the output of shift register 195d, and an additional four scan period delay is applied to the even data channel signals.

In the preferred embodiment described herein, even channel data signals lead odd channel data signals by 128 scan periods because of the distance between read heads. A further lead of five scan periods is provided by delay unit 205 and shift register 209 when transport speed variations, document slippage and other mechanical variations are nonexistent. Before the even and odd channel data may be interlaced under such nominal conditions, therefore, the even channel data must be delayed 133 scan periods. Such delay is provided by shift register 194 and delay unit 195 when multiplexer 198 is selected to the output of register 195d. Thus, the 129 scan period delay provided by shift register 194, and the four scan period delay provided by shift registers 195a-195d are combined to place the even data channel signals in coincidence with the odd data channel signals.

If an even data channel signal occurs one scan period earlier than would be predicted under nominal conditions, the even data channel signal is applied through shift register 195e to multiplexer 198 to provide an additional delay of one scan period. Further, if the even data channel signal occurs one scan period later than would be predicted under nominal conditions, the even data signal is led through shift register 195c to multiplexer 198 to provide a one scan period lead.

After multiplexer 198 has been selected to the proper output of delay unit 195, control logic unit 197 issues enable pulses alternately to the EN1 and EN2 inputs of interlace unit 199 to enable the IN1 and IN2 inputs, respectively. A serial stream of data is formed thereby which comprises even channel data signals interleaved with odd channel data signals.

Edge detectors 196 and 208 also detect the occurrence of a space between character image responses when two adjacent scans of a multi-element read head occurs without the detection of information. In this event, no leading edge signals are issued to unit 197. It is important to note that a space is not recognized until 14 scans of the read head elements have occurred after a previous leading edge detection. Thus, after a leading edge is detected, 16 scans must elapse before another leading edge may be detected, and the last two of the 16 scans must be void of information.

Further operations of the data recombination unit 30 may be understood by an inspection of TABLE I and FIG. 11. Although scan delay unit 195 has a flexibility for ±3 scan period corrections, the preferred embodiment disclosed herein provides for delay corrections of only one scan period.

TABLE I

| EVEN DATA | SELECT |
| --- | --- |
| 3 scans early | MDEZ |
| 2 scans early | MDEZ |
| 1 scan early | MEDZ |
| 0 scan early | MDEM |
| 1 scan late | MDEA |
| 2 scans late | MDEA |
| 3 scans late | MDEA |

FIG. 12

Figure 12:
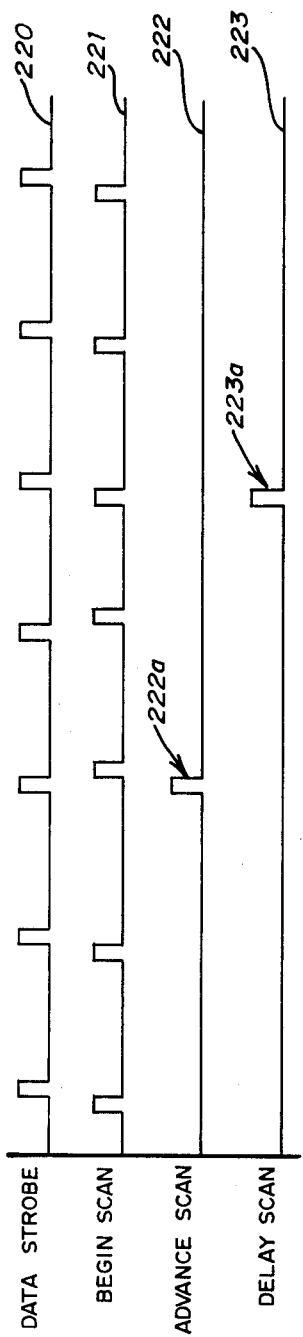
FIG. 12 is a timing and output waveform diagram of the operation of the even/odd channel control units comprising the synchronization unit of FIG. 10.

FIG. 12 is an output waveform and timing diagram of the operation of the control units 192 and 201 of FIG. 10.

For purposes of analysis, the description of FIG. 12 shall be directed to the processing of even data channel signals. Waveform 220 illustrates a data strobe occurring on line 26a, and waveform 221 illustrates a Begin Scan signal supplied by control logic unit 197 to line 202.

As before described, NRZ data occurring on line 24a is stored in a first of three registers 190a-190c. The three registers correspond to future, present and past data scans. When two successive data strobes occur on line 26a without a Begin Scan signal occurring, an advance data strobe pulse as illustrated by a pulse 222a of waveform 222 occurs to select multiplexer 191 to the past or third register input D3.

By way of contradistinction, a delay scan pulse as illustrated by pulse 223a of waveform 223 is generated by control unit 192 when there are two Begin Scan pulses without an intervening data strobe pulse. The delay scan pulse selects multiplexer 191 to the future or first register input D1. In such event, the multiplexer 191 remains selected to the future register until another data sample abnormality occurs. When an advance scan pulse is required, however, the next succeeding sample may be of the present or center register input D2.

FIG. 13

Figure 13:
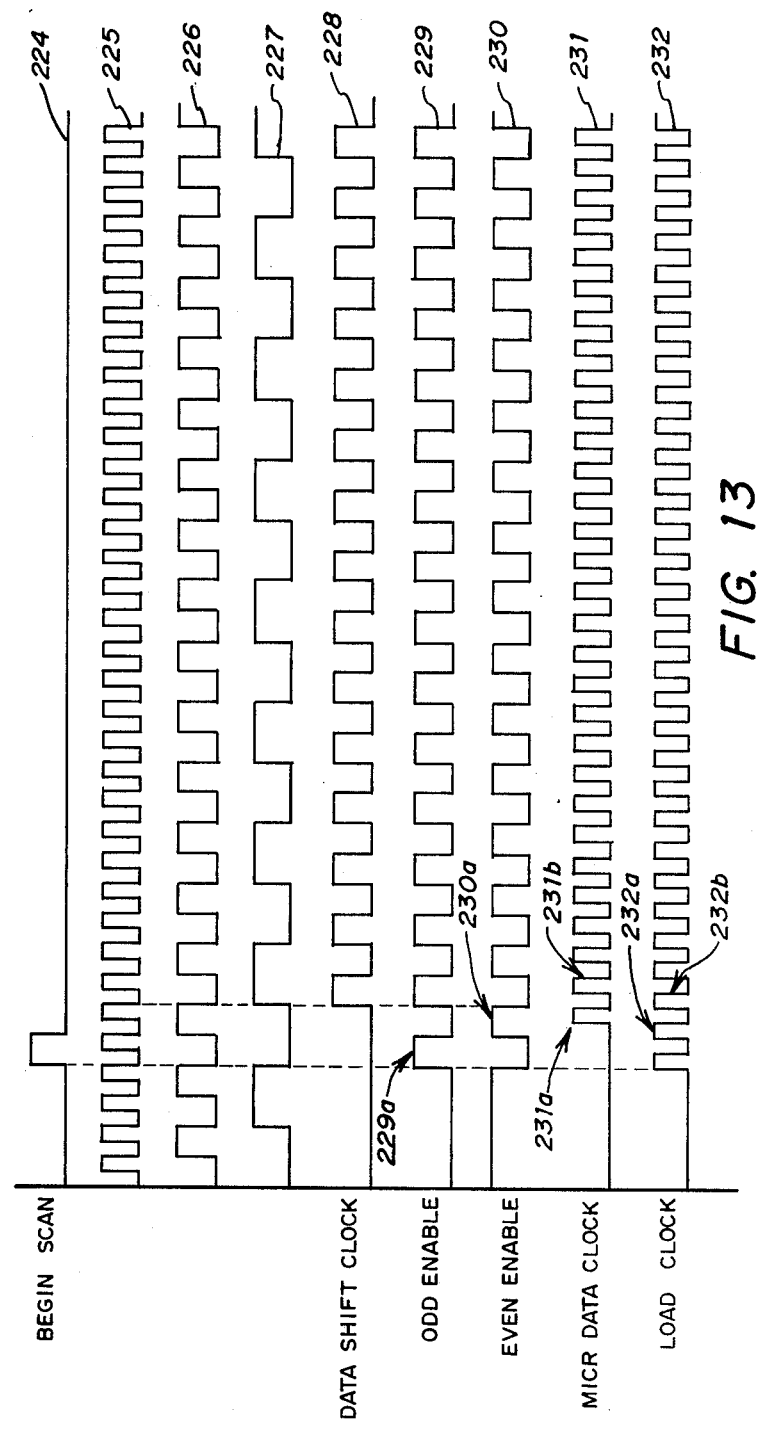
FIG. 13 is a timing and output waveform diagram of the operation of the synchronization and data recombination units of FIG. 10.

FIG. 13 is a timing and output waveform diagram illustrating the operation of the synchronization unit 23 and the recombination unit 30 of FIGS. 10 and 11.

A waveform 224 illustrates the Begin Scan signal generated by control logic unit 197 of FIG. 10. Waveforms 225, 226 and 227 illustrate 3.943, 1.971 and 0.986 MHz clock signals derived from the 7.885 MHz crystal comprising the system clock.

A waveform 228 illustrates the twenty pulse data shift clock signal generated by control logic 197 upon the occurrence of a leading edge of a Begin Scan pulse. More particularly, the leading edge of a first pulse of the data shift clock occurs at the trailing edge of the 1.971 MHz clock pulse of waveform 226 next occurring after a Begin Scan pulse.

Waveforms 229 and 230 illustrate odd enable and even enable signals, respectively, which are generated by control logic 197 of FIG. 11 to control the operation of interlace unit 199. As may be seen by inspection of the waveforms, the waveform pulses are staggered with an even enable pulse occurring between each two odd enable pulses.

A waveform 231 illustrates a clock pulse signal which is generated by interlace unit 199, and forwarded to succeeding systems. A waveform 232 illustrates a load clock signal which is generated by control logic unit 197 to load data into interlace unit 199. When an odd enable pulse such as a pulse 229a of waveform 229 occurs, odd data is received by interlace unit 199 and loaded into an internal buffer register upon the occurrence of a load clock pulse 232a of waveform 232. Immediately thereafter, a MICR data clock pulse 231a of waveform 231 occurs to signal a succeeding recognition unit that data is available at the output of interlace unit 199. After an odd enable pulse followed by a load pulse occurs, an even enable pulse 230a of waveform 230 occurs to admit even channel data into interlace unit 199. Thereafter, a load clock pulse 232b of waveform 232 occurs to load the data into an internal register of unit 199, and a MICR data clock pulse 231b of waveform 231 occurs to signal the succeeding recognition system that additional data is available at the output of unit 199.

In accordance with the invention, a system for merging data signal streams generated by two spaced apart MICR read heads sensing a magnetic ink information field is provided. More particularly, the leading edges of characters and intercharacter spaces occurring in the two data streams are detected, and differences in times of occurrence are determined to correct data stream phase differences at the read head scan rate. The data streams then are interlaced without the loss of data to form a single data stream.

The data lift portions of the systems herein described and illustrated in FIGS. 1–9 are also described and novel aspects thereof are claimed in U.S. patent application Ser. No. 679,676, filed Apr. 23, 1976.

Having described the invention in connection with a specific embodiment thereof, it is to be understood that further modifications may now suggest themselves to those skilled in the art, and it is intended to cover such modifications as fall within the scope of the appended claims.

What is claimed is:

1. A method of interlacing two data signal streams respectively generated by two MICR read heads which are spaced apart and in staggered arrangement, which comprises:
   (a) detecting leading edges of characters and intercharacter spaces in said two data signal streams;
   (b) measuring a difference between times of occurrence of a leading edge in said two data signal streams;
   (c) correcting the time of occurrence of one of said two data signal streams in discrete scan period increments of each character to eliminate said difference; and
   (d) interlacing said two data signal streams to form a single data signal stream representative of an information field sensed by said two MICR read heads.

2. A system for merging two digital data streams generated by spaced apart MICR read heads sensing a magnetic ink information field, which comprises:
   (a) dynamically adjustable delay means receiving one of said two digital data streams for synchronizing the occurrence of said two digital data streams;
   (b) selectable delay means receiving a second of said two digital data streams for time positioning said second of said two in the mid-range of operation of said dynamically adjustable delay means;
   (c) leading edge detector means in electrical communication with said dynamically adjustable delay means and said selectable delay means for signalling the occurrence of data signals in said two digital data streams;
   (d) logic control means responsive to said leading edge detector means for selectively adjusting at the scan rate said dynamically adjustable delay means; and
   (e) data stream interlacing means responsive to said logic control means and in electrical communication with both said dynamically adjustable delay means and said selectable delay means for merging said two digital data streams.

3. A data recombination system for merging two digital data streams generated by asynchronously operating MICR readers spaced apart in the direction of document travel, which comprises:
   (a) a first shift register means receiving a first of said two digital data streams for applying a delay equivalent to the transport delay between said MICR readers;
   (b) dynamically adjustable delay means connected to the output of said first shift register means for providing a plurality of scan period delays;
   (c) a first leading edge detector means in electrical communication with said first shift register means and said dynamically adjustable delay means for detecting a leading edge of a character in said first of said two digital data streams;
   (d) selectable delay means receiving a second of said two digital data streams for correcting data rate variations caused by misalignment of said MICR readers;
   (e) a second shift register means connected to the output of said selectable delay means for positioning said second of said two digital data streams in the mid-range of operation of said dynamically adjustable delay means;
   (f) a third shift register means connected to the output of said selectable delay means for applying a scan period delay to said second of said two digital data streams;
   (g) a second leading edge detector means in electrical communication with said selectable delay means and said third shift register means for detecting said leading edge in said second of said two digital data streams;
   (h) a multiplexer in electrical communication with said dynamically adjustable delay means;
   (i) interlace means receiving said first of said two digital data streams from said multiplexer and said second of said two digital data streams from said second shift register means for interlacing said two digital data streams; and
   (j) interlace control means responsive to said first and said second leading edge detector means for controlling the operation of said multiplexer and said interlace means.

4. The combination set forth in claim 3, wherein said dynamically adjustable delay means includes seven serially connected shift registers, each providing a delay of a single scan period.

5. The combination set forth in claim 3, wherein said selectable delay means includes two shift registers serially connected, and a three-to-one multiplexer having inputs connected to the inputs and outputs of said two shift registers.

6. The combination set forth in claim 3, wherein said interlace means is a two-to-one multiplexer.

7. A data merging system for combining digital data streams generated by two sensor arrays spaced apart in the direction of character movement, which comprises:

(a) a first shift register receiving a first digital data stream from a first of said two sensor arrays;

(b) dynamically adjustable delay means in electrical communication with said first shift register for advancing or delaying the occurrence of said first digital data stream in scan period increments;

(c) a first leading edge detector means connected to the output of said first shift register and in electrical communication with said dynamically adjustable delay means for signalling the occurrence of a leading edge of a data signal in said first digital data stream;

(d) a selectable delay means receiving a second digital data stream from a second of said two sensor arrays for delaying or advancing the time of occurrence of said second digital data stream by a single scan period;

(e) a second shift register receiving said second digital data stream from said selectable delay means;

(f) a second leading edge detector means in electrical communication with said selectable delay means and said second shift register for signalling the occurrence of said leading edge in said second digital data stream;

(g) logic control means responsive to said first and said second leading edge detector means for controlling the operation of said dynamically adjustable delay means;

(h) a third shift register connected to the output of said selectable delay means; and (i) data interlacing means responsive to said logic control means, and receiving said first digital data stream from said dynamically adjustable delay means and said second digital data stream from said third shift register for interlacing said first and said second digital data streams.

8. The combination set forth in claim 7, wherein said dynamically adjustable delay means includes seven shift registers serially connected, and a multiplexer having inputs connected to the output of each of said seven shift registers.

9. The combination set forth in claim 7, wherein said selectable delay means includes:

(a) a pair of serially connected shift registers;

(b) a three-to-one multiplexer having inputs connected to the inputs and outputs of said pair; and (c) a manual selector connected to the selection control input of said three-to-one multiplexer.

10. The combination set forth in claim 7, wherein said first shift register is of a bit size to induce a delay equivalent to the transport delay of an information field between said first and said second of said two sensor arrays.

11. A data merging system including two multi-element MICR read heads spaced apart in the direction of document movement, and signal formatting means for stabilizing analog responses of said MICR read heads within a waveform envelope and forming digital data signals therefrom, which comprises:

(a) synchronization means for synchronizing each of said digital data signals with a fixed frequency;

(b) converter means in electrical communication with said synchronization means for forming two serial data streams from said digital data signals; and (c) data merging means receiving said two serial data streams from said converter means, including:

(i) dynamically adjustable delay means receiving one of said two serial data streams for correcting phase differences between said two serial data streams, (ii) selectable delay means receiving a second of said two serial data streams for time positioning said second of said two serial data streams in the mid-range of operation of said dynamically adjustable delay means, (iii) leading edge detecting means in electrical communication with said dynamically adjustable delay means and said selectable delay means for signalling the occurrence of a leading edge of a character in said two serial data streams, (iv) logic control means responsive to said leading edge detecting means for selectively adjusting at the scan rate said dynamically adjustable delay means, and (v) interlacing means responsive to said logic control means and in electrical communication with both said dynamically adjustable delay means and said selectable delay means for merging said two serial data streams.

* * * * *